US005401411A

United States Patent [19]

Andersson

[11] Patent Number: 5,401,411

[45] Date of Patent: Mar. 28, 1995

[54] HYDROCYCLONE PLANT

[75] Inventor: Roine Andersson, Järfälla, Sweden

[73] Assignee: Celleco Hedemora AB, Stockholm, Sweden

[21] Appl. No.: 934,502

[22] PCT Filed: Apr. 29, 1991

[86] PCT No.: PCT/SE91/00302

§ 371 Date: Oct. 20, 1992

§ 102(e) Date: Oct. 20, 1992

[87] PCT Pub. No.: WO91/16988

PCT Pub. Date: Nov. 14, 1991

[30] Foreign Application Priority Data

May 7, 1990 [SE] Sweden ............................ 9001634

[51] Int. Cl.$^6$ ............................ B01D 21/26

[52] U.S. Cl. ............................ 210/512.2; 204/144; 204/211; 55/459.1

[58] Field of Search ............................ 210/512.1, 512.2; 204/144, 211; 55/459.1

[56] References Cited

U.S. PATENT DOCUMENTS 3,543,931 12/1970 Rastatter ............................ 209/211
3,959,150 5/1976 Frykhuh et al. ............................ 210/512.1
4,226,726 10/1980 Rehm ............................ 210/512.2
4,572,787 2/1986 Robinson ............................ 210/512.2

FOREIGN PATENT DOCUMENTS 435142 9/1984 Sweden .

*Primary Examiner*—Robert A. Dawson
*Assistant Examiner*—David Reitsnyder
*Attorney, Agent, or Firm*—Davis Hoxie Faithfull & Hapgood

[57] ABSTRACT

A hydrocyclone plant comprises a great number of hydrocyclones (1) arranged in a plurality of separate assemblies (10, 10A, 10B). Each hydrocyclone assembly includes branch pipes (6, 6A), to which the hydrocyclones of the assembly are connected in parallel relationship to one another. There are main pipes (13) of the same number as that of the branch pipes of each assembly, the branch pipes of each assembly being connected to said main pipes, respectively. According to the invention, clamping means (8, 9) are provided for releasably clamping each hydrocyclone substantially transversely against at least one of the associated branch pipes (6, 6A) of the latter, and the individual assemblies include various numbers of hydrocyclones, for optimizing the desired capacity of the hydrocyclone plant.

6 Claims, 2 Drawing Sheets

HYDROCYCLONE PLANT

Figure 1:
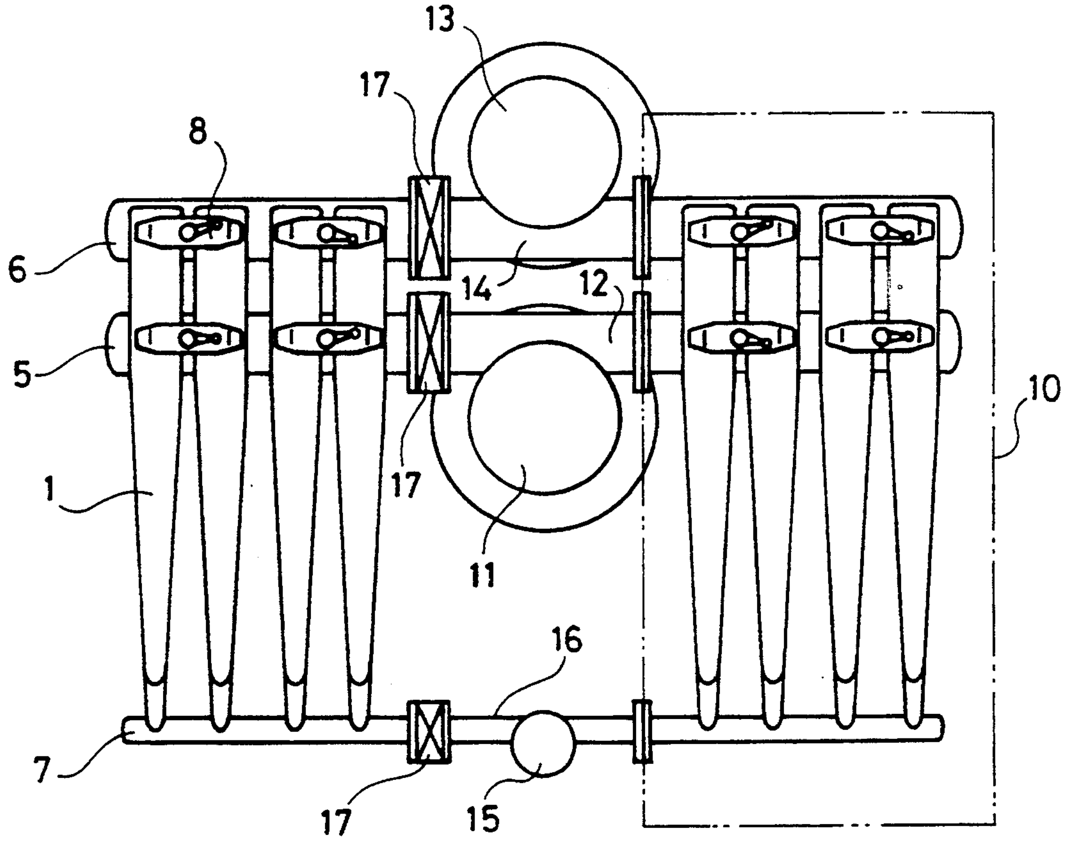

The present invention relates to a hydrocyclone plant comprising a great number of hydrocyclones arranged in a plurality of separate assemblies of hydrocyclones. Each hydrocyclone assembly includes branch pipes, to which the hydrocyclones of the assembly are connected in parallel relationship to one another. There are main pipes of the same number as that of the branch pipes of each hydrocyclone assembly. The branch pipes of each hydrocyclone assembly are releasably connected to the main pipes, respectively.

A prior hydrocyclone plant of this kind is disclosed in U.S. Pat. No. 3,543,931. In the prior plant, the hydrocyclone assemblies are formed by groups of ten hydrocyclones. The hydrocyclones are longitudinally clamped between manifolds. Each manifold is designed to serve exactly ten hydrocyclones, which results in that each assembly must include ten hydrocyclones. A disadvantage of this prior plant is that it is impossible to select the exact number of operating hydrocyclones required for a specific application or to meet a change in the flow conditions, in order to optimize the operation of the plant. Thus, the capacity of the prior plant can only be adjusted by adding or removing ten hydrocyclones at a time. Also, because of the complicated arrangement of manifolds, the prior plant would be relatively expensive to manufacture.

The object of the present invention is to provide a simple, inexpensive hydrocyclone plant, in which the capacity can be more accurately adjusted, as compared to the prior plant described above.

This object is obtained by means of a hydrocyclone plant of the kind initially described, which mainly is characterized in that clamping means are provided for releasably clamping each hydrocyclone substantially transversely against at least one of the associated branch pipes of the latter, and that the individual hydrocyclone assemblies include various numbers of hydrocyclones, for optimizing the desired capacity of the hydrocyclone plant.

Preferably, the clamping means comprise clamping members for clamping the hydrocyclones side by side in pairs against the branch pipes, which reduces the costs for producing the individual hydrocyclone assemblies.

In hydrocyclone assemblies having at least four hydrocyclones, it is suitable to arrange pairs of hydrocyclones at mutual sides of each branch pipe.

The branch pipes have the same transversal dimensions, in order to enable use of low cost standardize pipes and exchange of hydrocyclone assemblies at optional locations of the plant. However, the branch pipes preferably have various longitudinal extensions adapted to the number of hydrocyclones connected in the respective assemblies, which facilitates the installation of the hydrocyclone plant at a location having limited space available. Accordingly, smaller assemblies having a few number of hydrocyclones may be connected to the main pipes where the available space is small, while larger assemblies may be utilized where the available space is sufficient for these. This makes the new hydrocyclone plant flexible in installation.

Figure 2:
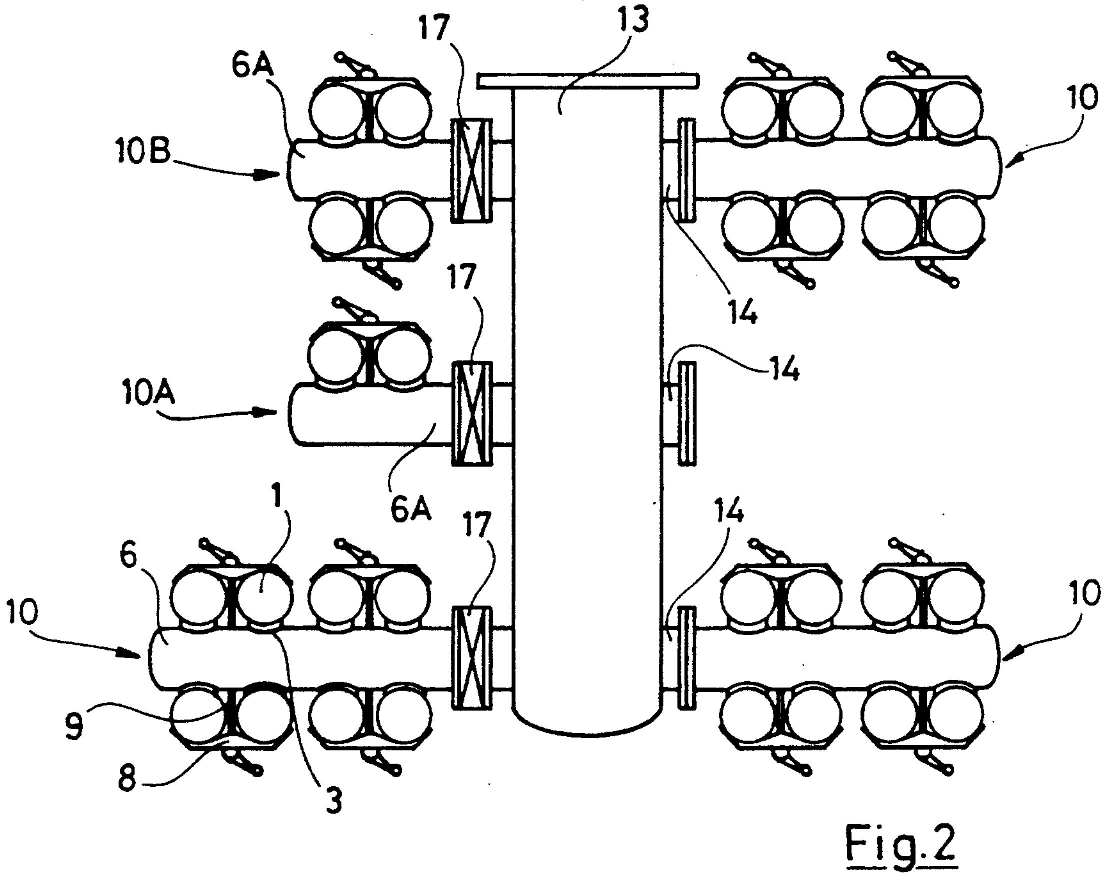
Figure 3:
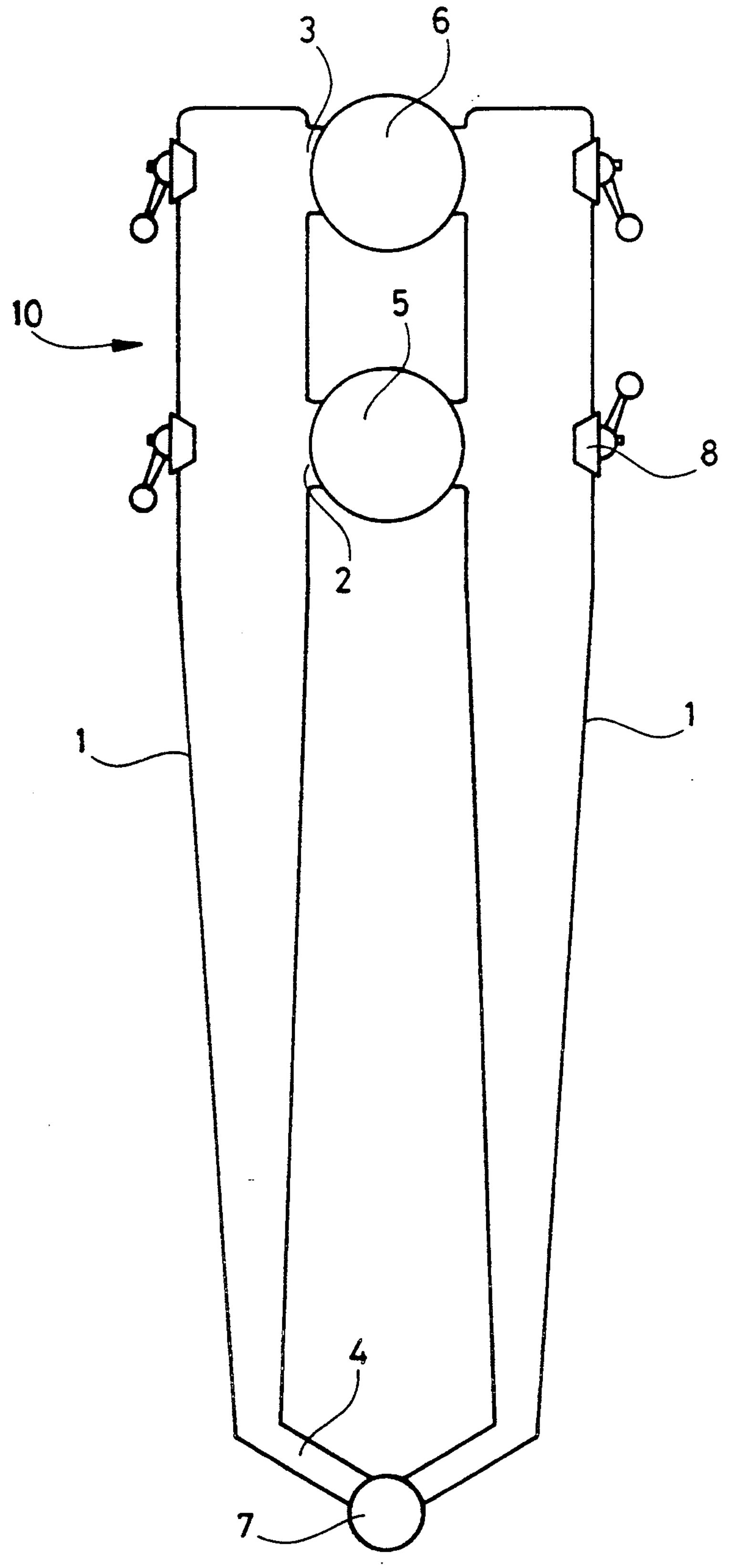

The invention is disclosed more closely in the following with reference to the accompanying drawing, in which FIG. 1 shows a side view of a hydrocyclone plant according to the invention, FIG. 2 shows a view from above of the hydrocyclone plant according to FIG. 1, and FIG. 3 shows a side view of a hydrocyclone assembly.

The hydrocyclone plant shown in the figures comprises thirty hydrocyclones 1, which are arranged in five groups, three of which have eight hydrocyclones 1 each, one of said groups has two hydrocyclones, and one of said groups has four hydrocyclones. Each hydrocyclone 1 has an inlet member 2 for a liquid mixture to be separated, an accept outlet member 3 for a created accept fraction, and a reject outlet member 4 for a created reject fraction. All of the hydrocyclones in each hydrocyclone group consisting of eight hydrocyclones have their inlet members connected to a branch supply pipe 5 for supplying said liquid mixture, their accept outlet members 3 connected to a branch discharge pipe 6 for discharging said created accept fractions, and their reject outlet members 4 connected to a branch discharge pipe 7 for discharging said created reject fractions. The two groups of hydrocyclones which have two and four hydrocyclones 1, respectively, have their inlet members 2 connected to shorter branch supply pipes, their accept outlet members 3 connected to shorter branch accept discharge pipes 6A, and their reject outlet members 4 connected to shorter branch reject discharge pipes.

The hydrocyclones in each hydrocyclone group are clamped in pairs to the branch pipes 5, 6 and 6A by means of clamping members in the form of arms 8 and bars 9. Thus, the hydrocyclones 1 and the branch pipes 5–7 form separate hydrocyclone assemblies, namely: three assemblies 10 having eight hydrocyclones 1 (FIG. 3), one assembly 10A having two hydrocyclones 1, and one assembly 10B having four hydrocyclones 1. Corresponding branch pipes 5–7 in the five hydrocyclone assemblies 10 have the same transversel dimensions. Consequently, the five hydrocyclone assemblies 10, 10A, 10B are exchangeable with one another.

Each hydrocyclone assembly 10, 10A, 10B has its branch supply pipe releasably connected to a main supply pipe 11 via a connection pipe 12 for supplying said liquid mixture to the hydrocyclones 1, its branch accept discharge pipe releasably connected to a main discharge pipe 13 via a connection pipe 14 for discharging created accept fractions from the hydrocyclones 1 and its branch reject discharge pipe releasably connected to a main discharge pipe 15 via a connection pipe 16 for discharging created reject fractions from the hydrocyclones 1. The branch pipes of three of the hydrocyclone assemblies 10, 10A, 10B are connected to the main pipes 11, 13 and 15 via valves 17. Of course, all of the branch pipes, however, may be connected to the main pipes 11–13 via valves.

If any hydrocyclone 1 in one of the three hydrocyclone assemblies 10, 10A, 10B, which is connected to the main pipes 11, 13, 15 via the valves 17, would need to be exchanged during operation this can take place when the valves 17 to the hydrocyclone assembly in question have been closed. The operation of the hydrocyclone plant may however continue in a somewhat reduced capacity until the exchange of the hydrocyclone has been carried through.

The capacity of the hydrocyclone plant may gradually be changed when necessary by readily exchanging one or more of the hydrocyclone assemblies of the plant for other assemblies having different numbers of hydrocyclones.

I claim:

1. A hydrocyclone plant, comprising:

a multiplicity of hydrocyclones arranged in a plurality of separate assemblies of hydrocyclones, each said assembly having branch pipes to which the hydrocyclones of the assembly are connected in parallel relationship to one another, main pipes of the same number as the number of the branch pipes of each said assembly, the branch pipes being releasably connected to the main pipes, whereby each said assembly including its branch pipes is releasable from the main pipes, clamping means arranged to releasably clamp each hydrocyclone substantially transversely against at least one of the branch pipes to which the hydrocyclone connects, the individual hydrocyclone assemblies including at least two assemblies having different numbers of hydrocyclones, for optimizing the desired capacity of the hydrocyclone plant.

2. A hydrocyclone plant according to claim 1, wherein the clamping means comprises clamping members arranged to clamp the hydrocyclones side by side in pairs against the branch pipes.

3. A hydrocyclone plant according to claim 2, wherein said pairs of hydrocyclones are arranged at mutual sides of each branch pipe.

4. A hydrocyclone plant according to claim 3, wherein at least one hydrocyclone assembly has four pairs of hydrocyclones.

5. A hydrocyclone plant according to claim 1, in which the branch pipes in each assembly have the same transverse dimensions as the corresponding branch pipes in the other assemblies but the length of the branch pipes in different assemblies are adapted to the number of hydrocyclones in each assembly.

6. A hydrocyclone plant according to claim 1 wherein each assembly has a branch pipe for feed liquid, a branch pipe for accepts and a branch pipe for rejects.

* * * * *